Figure 1:
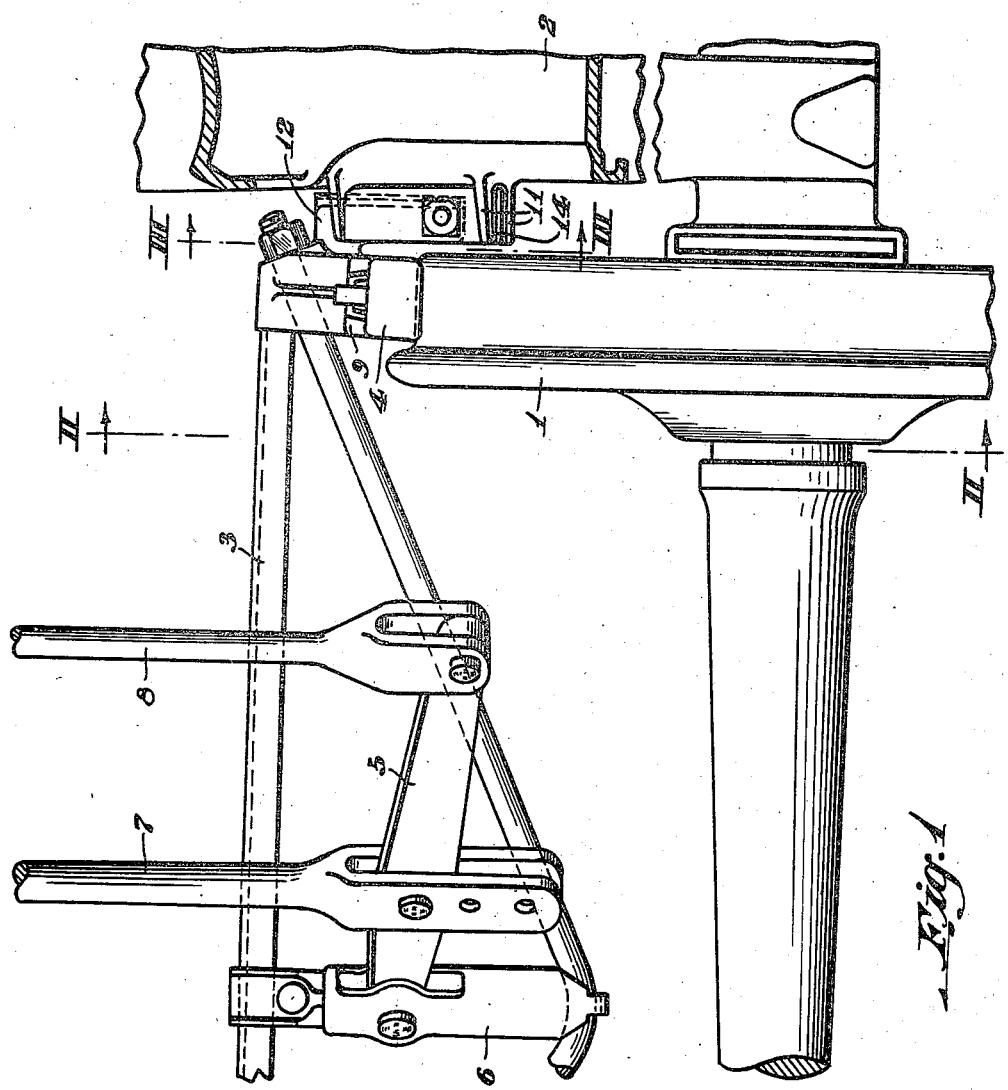

March 10, 1942.  F. SCHAEFER  2,276,065
BRAKE BEAM HEAD
Filed Aug. 2, 1940  3 Sheets-Sheet 1

INVENTOR.
Frederic Schaefer
BY Brown, Critchlow & Flick
his ATTORNEYS.

March 10, 1942.    F. SCHAEFER    2,276,065
BRAKE BEAM HEAD
Filed Aug. 2, 1940    3 Sheets-Sheet 2

INVENTOR.
Frederic Schaefer
BY Brown, Critchlow & Flick
his ATTORNEYS.

March 10, 1942.     F. SCHAEFER     2,276,065
BRAKE BEAM HEAD
Filed Aug. 2, 1940     3 Sheets-Sheet 3
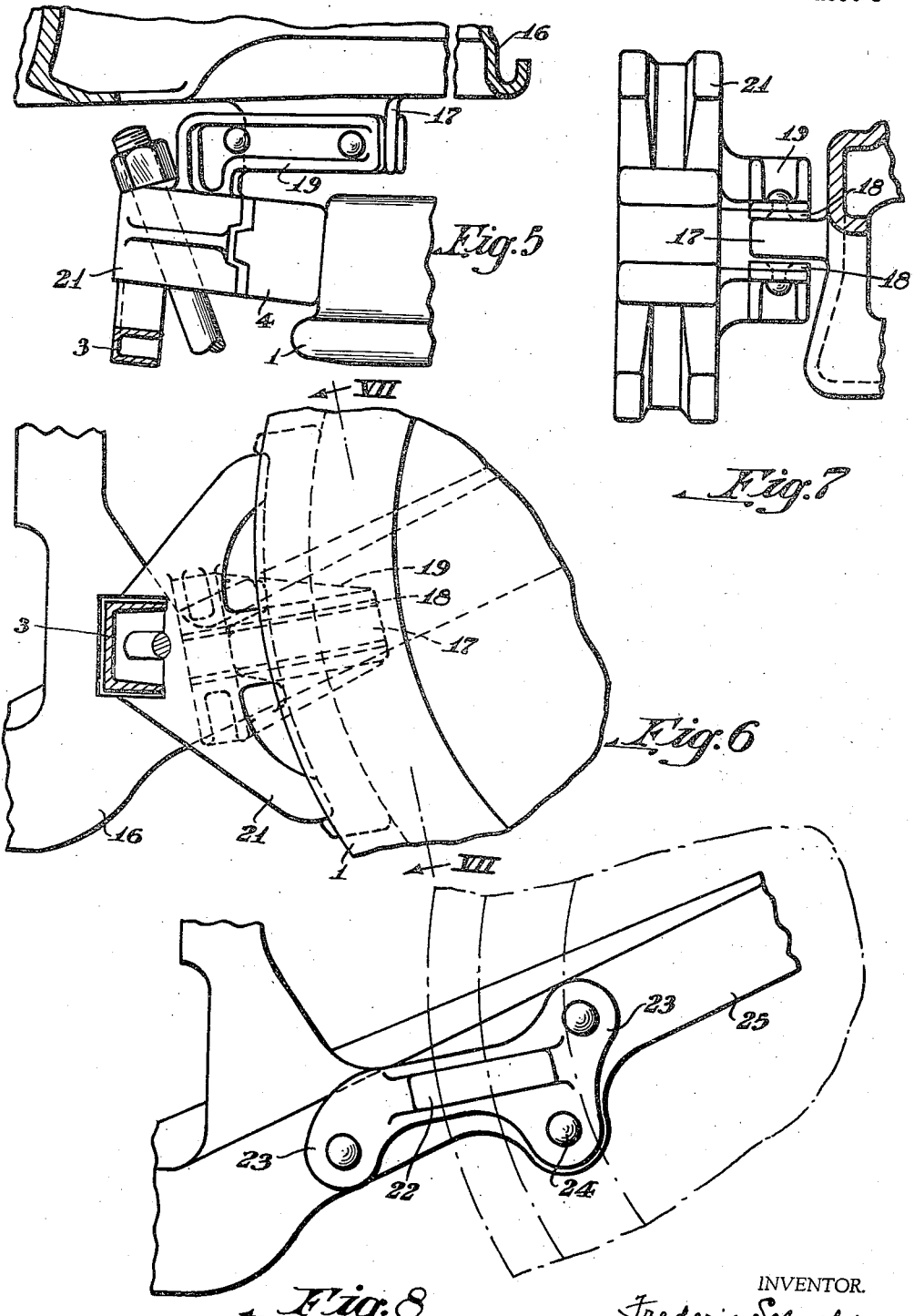

Patented Mar. 10, 1942

2,276,065

UNITED STATES PATENT OFFICE 2,276,065

BRAKE BEAM HEAD

Frederic Schaefer, Pittsburgh, Pa.

Application August 2, 1940, Serial No. 350,032

4 Claims. (Cl. 188—212)

This invention relates to railway car brake rigging, and more particularly to the brake heads used therein.

The common way of supporting brake beams in freight car trucks is by loop or U-type hangers that are suspended from brackets attached to the truck side frames, the lower cross members of the hangers being inserted in slots of the brake heads secured to the ends of the beams. More recently it has been proposed to eliminate the hangers and hanger brackets by supporting the ends of brake beams on ledges projecting inwardly from the side frames. For this purpose the ends of the beams are extended sufficiently to rest on the ledges, so that special brake beams are required. As the compression member of the beam is the part ordinarily extended for supporting it, the weight of the heads, shoes and tension member throws the beam off balance and tends to cause it to cant and bind against the supporting ledges and also to wear unevenly. Furthermore, the beam supporting ledges are inclined upwardly toward the adjacent end of the side frame so that the beam will move radially of the adjacent car wheels. The beam strut is therefore inclined longitudinally of the truck while the force applied to it by the brake lever in applying the brakes is exerted substantially horizontally. The application of this force at an angle to the axis of the strut, instead of parallel to it, results in over-stressing the brake beam and shortening its life.

It is among the objects of this invention to provide hangerless brake rigging of this general character in which ordinary brake beams can be used; in which the plane of the brake beam structure remains substantially horizontal at all times; in which the brake beam is balanced and slides readily and wears evenly on the supporting ledges without binding; and in one embodiment of which only the brake heads are changed in order to adapt an ordinary beam for hangerless support.

In accordance with this invention a brake head is rigidly mounted in the usual manner on each end of an ordinary brake beam having standard length compression and tension members. However, for supporting the beam each brake head is provided wtih one or more laterally projecting members that slidably engage one or more projections on the adjacent side frame of the truck. In order that the beam may remain horizontal but travel or move radially of the wheels when the braking force is applied as has been the usual practice, these projecting members are inclined upwardly toward the adjacent end of the truck relative to the plane of the beam. To balance the beam the projecting members are extended forward past the shoe-engaging surface of the brake head and preferably past the braking surface of the brake shoe carried thereby.

Figure 2:
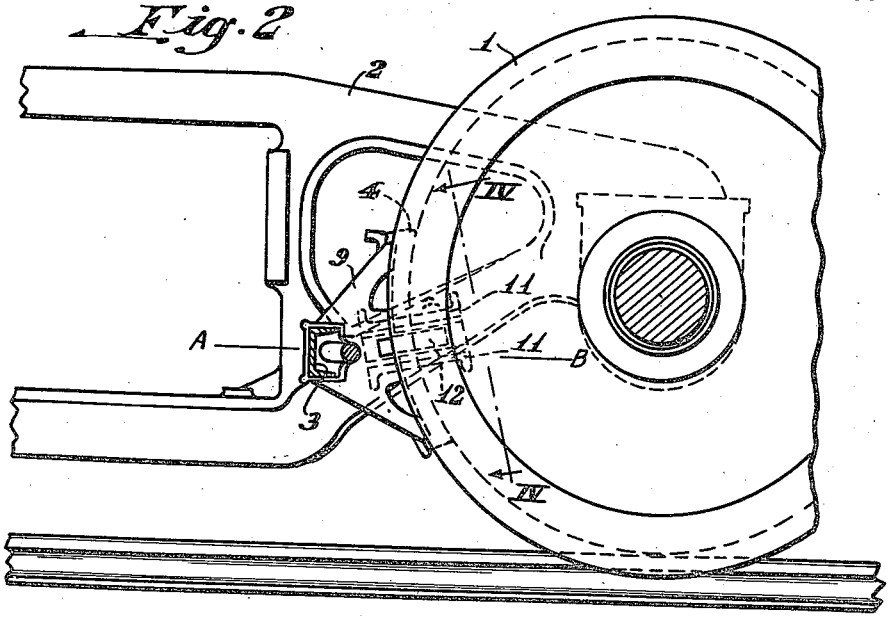
Figure 3:
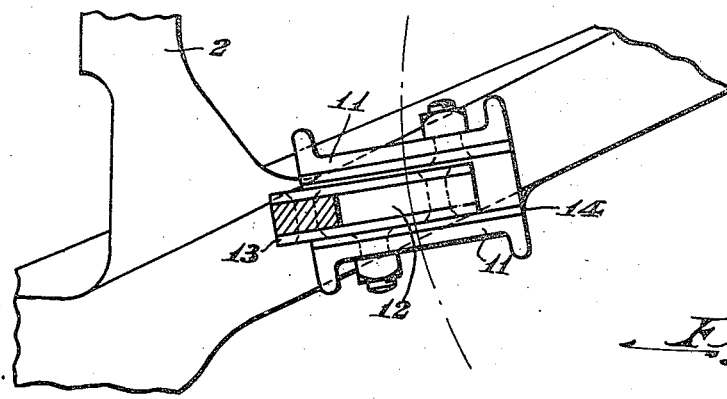
Figure 4:
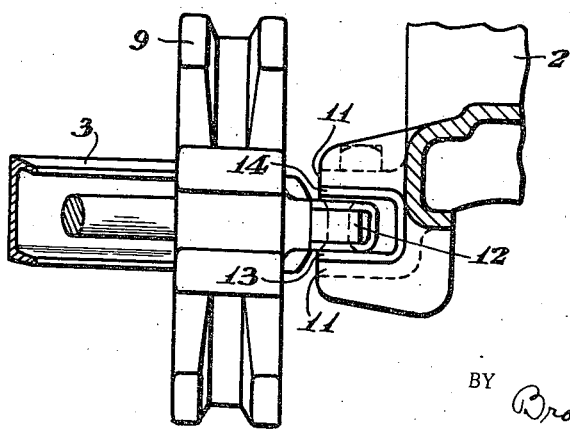

The preferred embodiment of the invention is illustrated in the accompanying drawings in which Fig. 1 is a fragmentary plan view of a railway car truck and brake rigging; Figs. 2 and 3 are vertical sections taken on the lines II—II and III—III, respectively, of Fig. 1; Fig. 4 is a fragmentary vertical section taken on the line IV—IV of Fig. 2 with the brake shoe removed; Figs. 5, 6 and 7 are views similar to Figs. 1, 2 and 4, respectively, of a modification of this invention; and Fig. 8 is a fragmentary view of the inside of a truck side frame showing another modification of the invention.

Referring to Fig. 1 of the drawings, a railway car wheel 1 is journaled in one end of a car truck side frame 2 in the customary manner, and a brake beam 3 is disposed in the usual location and is actuated to apply and release a brake shoe 4 by a brake lever 5 pivotally connected to its strut 6 and to a connecting rod 7 and a pull rod 8. The brake shoe is carried by a brake head 9 rigidly mounted on the end portion of the brake beam. Instead of supporting the brake beam in the usual manner by brake hangers, in accordance with this invention the ends of the beam are slidably supported by the side frames in a novel way. For this purpose, as shown in Figs. 3 and 4, each side frame is provided with a pair of vertically spaced parallel beam-supporting brackets or ledges 11 which may be formed in the frame or may project laterally therefrom as integral or separate elements. The two ledges of each pair are shown in Figs. 2 and 3 inclined upwardly toward the adjacent end of the truck at such an angle that they extend radially of the wheel, which is the direction in which the beam and shoes should move in applying the brakes.

It is a feature of this invention that each brake head is provided with a laterally projecting member 12, preferably in the form af an integral lug, that extends between the adjacent pair of ledges by which it is supported and which therefore support the brake beam. The upper ledge holds the beam down in place, especially when the brakes are applied and the wheel is rotating in a clockwise direction as viewed in Fig. 2. It is preferred that lugs 12 not bear directly against the ledges, but be spaced therefrom by U-shaped hardened plates that are better able to withstand wear. As shown in Figs. 3 and 4, wear plate 13 is rigidly connected to lug 12 whose upper, lower and outer surfaces it protects, while wear plate 14, attached to the ledges, protects their upper and lower surfaces and the vertical surface connecting them. When brake lever 5 moves the beam toward the wheels, lugs 12 slide between ledges 11 by which they are guided.

Another feature of this invention is that although lugs 12 must be inclined at the same angle as their supporting ledges, the plane of the beam, represented by line A—B in Fig. 2, remains substantially horizontal at all times. This is accomplished, of course, by inclining the lugs relative to the beam, and the purpose is to prolong the life of the beam. That is, the braking force that is applied to the beam by brake lever 5 is exerted along a line substantially parallel to the plane of the beam or the axis of the strut 6, which is the direction relative to the beam in which the beam has the greatest strength. To aid in balancing the beam so that it will not tilt and thereby cause lugs 12 to cant and bind between their supporting ledges, each lug is proportioned with its length several times its vertical thickness and extends forward from its brake head, as shown in Figs. 1 and 2. Preferably, the lug extends forward beyond the braking surface of the brake shoe from which it is spaced in order to clear the wheel. Due to this and the fact that the rear end of the lug is attached to the head at a point in front of the compression member of the beam, the beam is held level and the lugs slide easily between the ledges and therefore wear evenly instead of wearing rapidly at two diagonally opposite corners.

This invention makes it possible to change over to hangerless brake rigging without using a special brake beam, or to readily adapt an ordinary brake beam for hangerless support at its ends. The cost of the special brake heads used for this purpose is less than the cost of a special beam. My invention also makes it possible for the beam to balance and remain horizontal as it should for longest life.

In the modification shown in Figs. 5, 6 and 7 the major elements of this invention are just reversed, that is, the truck side frame 16 is provided with an inwardly projecting lug 17 which is slidably engaged, through the medium of wear plates 18 by a pair of ledges or jaws 19 projecting laterally from the adjacent brake head 21. The lugs and jaws are inclined upwardly toward the adjacent end of the truck at an angle that causes them to extend radially of the wheel, but the plane of the brake beam structure remains substantially horizontal at all times. The side frame lug supports the brake beam through the medium of jaws 19 and also guides it in its movements toward and away from the wheels.

The side frame lug may be made integral with the frame, as shown in Figs. 5 to 7, or it may be made as a separate member and then connected to the side frame as shown in Fig. 8. The latter lug 22 is provided with laterally projecting flange-like ears 23 in which there are holes through which suitable fastening members 24, such as rivets, extend for connecting the lug to the side frame 25. An advantage of a separate lug of this character is that it can be removed when worn or damaged and replaced by a new one.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A brake head for use with a brake beam and car truck side frames having beam supporting ledges, said head being adapted to be rigidly connected to one end of the beam and to support a brake shoe, said head being provided with a laterally projecting member adapted to slidably rest on one of said side frame ledges for supporting the beam, and said member extending forward past the shoe-engaging surface of the head for balancing the beam.

2. A brake head for use with a brake beam and car truck side frames having beam supporting ledges, said head being adapted to be rigidly connected to one end of the beam and to support a brake shoe, said head being provided with a lug that projects laterally and then extends substantially parallel to the side of the head and past the braking face of the shoe carried by the head, said lug being adapted to slidably rest on one of said side frame ledges for supporting the beam.

3. The combination with a substantially horizontal brake beam and a pair of car truck side frames having beam supporting ledges inclined upwardly toward the adjacent end of the frames, of a brake head rigidly mounted on each end of the beam and adapted to support a brake shoe, said head being provided with a laterally projecting lug slidably supported by the adjacent side frame ledge and extending forward past the braking surface of the shoe carried by the head, and wearing plates secured to said ledge and lug for spacing them apart.

4. The combination with a brake beam and car truck side frames, of a supporting member projecting inwardly from each of the side frames, and a brake head mounted on each end of the beam and provided with a pair of outwardly projecting spaced ledges slidably receiving the adjacent supporting member between them for supporting the beam, said ledges projecting laterally and then extending substantially parallel to the side of the head and past the shoe-engaging surface of the head for balancing the beam.

FREDERIC SCHAEFER.